though the same amount of calcium peroxide. Investigation of this phenomenon has shown that the better laboratory results are due to the fact that the calcium peroxide was not actually brought into contact with the liquid constituents of the dough mixture until after the liquids have been more or less uniformly distributed through the mixture.

United States Patent Office 2,970,915
Patented Feb. 7, 1961

2,970,915
METHOD OF PREPARING BREAD

Charles G. Ferrari, Evanston, Ill., assignor to J. R. Short Milling Company, Chicago, Ill., a corporation of Illinois No Drawing. Filed June 27, 1958, Ser. No. 744,897

3 Claims. (Cl. 99—90)

This invention relates to novel bread improvers and to the preparation of baked goods therewith.

It has long been common practice in the baking industry to employ, as additive in the dough-forming mixtures from which baked goods are prepared, certain materials capable of acting to produce specific improvements observable either in the dough itself or in the baked goods produced therefrom. Such materials have become known as "bread improvers," this term embracing not only individual agents but also compositions containing more than one active agent. Thus, the invention may involve "multicomponent bread improvers" comprising both an inorganic bread improver compound, such as calcium peroxide, and a "dough whitener," such as enzymatically active soy flour.

In its broader aspects, the invention provides bread improvers wherein certain active constituents are associated with a protective material in such fashion as to accomplish a desirable control of the bread improver action during preparation of the dough. Other embodiments employ such protective material on one or more of the ingredients of a multi-agent bread improver composition to attain, in addition to the advantage just mentioned, elimination or satisfactory reduction of certain types of degradation of the bread improver during storage.

The broader embodiments of the invention arise from my observation that more advantage is sometimes obtained from use of a given amount of a bread improver in laboratory baking tests than results in actual commercial baking. Thus, I observed that use of conventional bread improving amounts of calcium peroxide in laboratory baking gave more water absorption and noticeably better bread than in commercial baking procedures with the same amount of calcium peroxide. Investigation of this phenomenon has shown that the better laboratory results are due to the fact that the calcium peroxide was not actually brought into contact with the liquid constituents of the dough mixture until after the liquids have been more or less uniformly distributed through the mixture.

In this connection, it is a general object of the invention to provide novel bread improvers which, though added to the dough mixture at the same time as the other ingredients, will not come into full action until after a preliminary mixing period.

Another object is to provide bread improvers comprising a particular bread improver material, particles of which are physically connected to an edible protective material capable of being taken up, and thus removed from the bread improver particles, by the liquid phase of a dough during dough mixing.

A further object is to provide bread improvers comprising a particulate bread improver material, particles of which are physically connected to an edible protective material of such nature as to be removed, in the dough mix, only as a result of both contact with the liquid dough constituents and the mechanical working resulting from dough mixing.

Certain especially advantageous embodiments of the invention embrace multi-agent bread improver compositions wherein two active agents are present in admixture, one being sensitive to the other so that the composition tends to become less effective when it is stored for any relatively long period of time. In this connection, I have found that prolonged storage of enzymatically active legume materials, for example, in the presence of certain inorganic bread improver compounds, such as calcium peroxide or dicalcium phosphate, frequently results in drastic deactivation of the enzyme content of the legume material. The same is true when other enzyme materials are stored with such inorganic bread improver compounds. Similarly, when a bread improver material having a substantial unsaturated fat content is stored in the presence of, say, calcium peroxide, the latter has a marked tendency to cause the fat to become rancid, so making the material unsuitable for inclusion in bread dough or the like. Thus, a full-fat enzymatically active soy flour, for example, is sensitive to calcium peroxide in two fashions, first because of enzyme deactivation and second because of rancidity formation.

In this connection, it is another object of the invention to provide multi-agent bread improver compositions wherein one component, such as calcium peroxide, is physically attached to an edible protective material in such fashion as to at least minimize adverse effects which that one component tends to have on a second component, such as enzymatically active soy flour. As will be later apparent, use of the protective material in this manner serves both to (1) prevent the composition from deteriorating during storage, and (2) delay the action of one of the bread improver agents during dough preparation.

Yet another object is to provide improved methods for making baked goods, using the novel compositions of the invention.

As will be apparent from the foregoing, the invention is applicable to a great many bread improver materials. Those materials to which the protective covering of the invention is applied can be any of the solid, particulate bread improver agents, particularly the inorganic bread improver compounds such as calcium peroxide, the phosphates of calcium and ammonium, particularly monocalcium phosphate, dicalcium phosphate, diammonium phosphate and mixtures thereof, the persulfates of calcium, potassium, sodium and ammonium, potassium bromate, potassium iodate, ammonium sulfate, calcium sulfate, ammonium chloride, sodium chlorite, and calcium carbonate. Considering multi-agent bread improver compositions, the invention may employ, as materials which are "sensitive" in the manner hereinbefore explained, any of the enzymatically active legume materials capable of bleaching carotinoids and modifying dough properties. Thus, I can employ the enzymatically active flours or meals obtained from soy beans, peas, peanuts, beans or lentils. Such materials may be fat-free, as is the case when the oil content has been extracted with a solvent such as hexane, or may contain all or a part of their natural fat content. Other sensitive materials useful in the improved compositions of the invention include the various commercial enzyme materials, and particularly the fungal enzyme concentrates.

In considering compositions comprising a material such as full-fat enzymatically active soy flour, as well as an inorganic bread improver compound, it is important to note that there is an opportunity both for enzyme deactivation and for development of rancidity. Some of the inorganic bread improver compounds, particularly calcium peroxide and dicalcium phosphate, tend both to deactivate enzymes and to promote rancidity. Others, such as potassium bromate, tend to deactivate enzymes but are not important rancidity promoters.

The protective materials employed in accordance with the invention are, broadly, those edible materials which, while capable of firmly adhering to bread improver particles, are effectively removed from such particles, as by being dissolved or emulsified, when subjected to direct contact with aqueous fluids and to mechanical working. I have observed that particularly advantageous results are obtained when employing, as the protective material, one which is water emulsifiable. It appears that such advantageous results occur because the emulsifiable materials, even though they be present in the form of a very thin coating, are not removed immediately upon contact with the aqueous phase of the dough but rather require both such contact and a substantial amount of mechanical working, as occurs during dough mixing.

In this connection, I have discovered a highly advantageous class of edible protective materials useful in accordance with the invention, such class consisting of lecithin, the monoglycerides having an iodine value not exceeding 50, mixed mono- and diglycerides with the mixture having an iodine value not exceeding 50, and the tartaric acid esters of mono- and diglycerides having an iodine value not exceeding 50. Thus, I find glyceryl monostearate, glyceryl monopalmitate and the mixed monoglycerides obtained commercially from lard, vegetable oils and edible fats, such mixtures having an iodine value not in excess of 50, to be excellent protective materials for use in accordance with the invention. Similarly, such monoglyceride esters as the diacetyl tartaric acid ester of glyceryl monostearate are particularly useful. On the other hand, those monoglycerides and glyceride mixtures having iodine values in excess of 50 are unsuitable because of their marked tendency to develop rancidity during storage prior to actual use. In this connection, it is to be noted that, in accordance with the invention, the protective material is employed in direct contact with various chemicals which tend, to a greater or lesser degree, to promote rancidity. Accordingly, such monoglyceride materials as those derived from soybean or cotton seed oil and having an iodine value in excess of 50, as well as those containing substantial proportions of oleic, linoleic, linolenic, or arachadonic acids, for example, are unsuitable. The presence of diglycerides in small quantities is not deleterious, so long as the diglyceride is stable and derived from a fatty acid of such nature that the iodine value of the total glyceride mixture is not in excess of 50.

In addition to the various constituents hereinbefore mentioned, the bread improver compositions of the invention can include other materials which serve well known and conventional purposes. Particularly, it is frequently desirable to employ solid, particulate, edible diluents or extenders which serve to reduce the criticality of measurements during use of the compositions. Such materials also serve to decrease the contact between particles of the active ingredients. Especially useful diluents or extenders are corn flour, partially dextrinized corn flour, other cereal flours, starches, sugars and salt, or mixtures of such materials.

Broadly, I apply the edible protective material to the particulate bread improver agent in such fashion that the protective material covers at least a portion of the surface of at least a majority of the particles of the bread improver agent. Thus, the particles of the bread improver agent can all be individually enveloped in the protective material, as later discussed in detail, or a plurality of such particles can be variously connected to a somewhat larger particle of the protective material, as in the manner described in detail in my copending application Serial No. 745,173, filed concurrently herewith.

According to one embodiment of the invention, all or substantially all of the particles of the bread improver compound are provided with a thin, continuous, enveloping film of the protective material. This can be accomplished by first preparing a solution of the protective material in a solvent which has little or no effect on the bread improver agent to be coated, then slurrying the particulate bread improver agent in such solution, so that the solution of protective material thoroughly wets the surfaces of the particles. After a short period of stirring, the solid particles, carrying a substantial amount of the solution on their surfaces, are recovered from the solution and the residual solvent removed from the particles in any suitable fashion. The thickness of the coating so applied to the particles of bread improver agent can be controlled by selection of the concentration of the solution of protective material and by repeating the operation in order to build up a thicker film, when desired.

In general, the amount of protective material applied to the particles of bread improver agent can vary from a few percent of the total weight of the bread improver agent to as much as twice that weight, depending upon the nature of the protective material, the manner in which it is applied to the particulate bread improver agent, the composition of the dough mixture to be treated, and the severity of the dough-mixing operation involved. When employing the preferred water-emulsifiable protective materials hereinbefore identified to prepare a bread improver composition for use in making white bread by conventional batch baking methods, an amount of protective material equal to 2–5% of the weight of the particulate bread improver agent is entirely satisfactory if the protective material is applied as a thin film individually coating the particles of the bread improver agent. If the protective material is applied by a mulling operation or a like procedure so that the same is not evenly distributed over the entire surfaces of the particulate material being treated, and again assuming that the bread improver composition is to be employed in doughs of conventional formulation baked by conventional batch methods, considerably larger amounts of the protective material can be successfully employed.

While a preferred embodiment of the invention involves application of the protective material to the bread improver particles as a continuous film, it should be understood that it is not essential to the invention that the bread improver particles be completely enveloped. This is particularly true, when the protective material employed is one of the water-emulsifiable materials hereinbefore identified. I have found that satisfactory results can be obtained, both as to accomplishing delayed action of the bread improver agent in the dough and as to protection of a sensitive component of the bread improver composition during storage, so long as at least a majority of the particles of the particular bread improver agent have at least a major portion of their surfaces attached to the protective material.

*Example 1*

In this example the protective material is a distilled monoglyceride prepared from edible animal fat and having a minimum monoester content of 90%, an iodine value of approximately 40 and a congealing point of approximately 58° C. Such a monoglyceride is commercially available under the trade designation Myverol type 18–30, manufactured by Distillation Products Industries, Rochester, New York. Eighty grams of such monoglyceride is dissolved in 1,000 ml. of butanol, the butanol being warmed to a temperature below its boiling point and the monoglyceride being added with continual stirring to promote solution. To the resulting solution, 300 grams of commercial food grade calcium peroxide (60% $CaO_2$, all finer than 100 mesh) is added, converting the solution to a thick slurry. The slurry is immediately filtered with the aid of suction, the moist cake recovered and spread in a thin layer to dry at room temperature. When dry, the product is friable, consisting of particles of calcium peroxide each enveloped in a relatively thin film of the monoglyceride. Approximately 320 grams of material is recovered, approximately 20 grams of the monoglyceride having been deposited on the calcium peroxide.

This general procedure can be successively repeated to coat bread improver compounds other than calcium peroxide, such as calcium and ammonium phosphates, potassium bromate, potassium iodate and calcium sulfate, for example. The relative amount of monoglyceride deposited upon the particles of the bread improver compound, and thus the thickness of the protective film established on such particles, depends upon the concentration of the monoglyceride solution employed and can be regulated somewhat by the speed of the filter. Thus, for a heavily protected compound, a more concentrated solution of monoglyceride would be employed, while a very dilute solution might be used when only a moderate protection is desired. When employing the special water-emulsifiable protective materials hereinbefore defined, in accordance with this example, the solvent can be any of the lower alkanols, hexane, pentane, or like solvents.

*Example 2*

A bread improver composition is prepared by uniformly blending 300 grams of the monoglyceride-coated calcium peroxide product of Example 1 with 24,700 grams of partially dextrinized corn flour as a diluent to yield 25,000 grams of a composition in which the calcium peroxide is the sole active agent. Even in this simple composition, the coating of monoglyceride has a distinct advantage in that it tends to protect the calcium peroxide from contact with atmospheric moisture during storage and thus effects a better storage life.

To provide a conventional calcium peroxide composition for comparison with the composition of this example, 290 grams of uncoated food grade calcium peroxide (60% calcium peroxide, all finer than 100 mesh) is uniformly blended with 24,710 grams of partially dextrinized corn flour. It will be noted that the concentration of calcium peroxide is identical for the two compositions.

To compare the effects of the two compositions in bread doughs, a test bake is carried out by the standard sponge-dough procedure, preparing control dough 1 with the conventional, uncoated calcium peroxide, and test dough 2 with the novel monoglyceride-coated calcium peroxide composition of this example. The following formula is employed:

| Sponge | Ingredient | Dough |
|---|---|---|
| 450.0 grams | Flour | 250.0 grams. |
| 275.0 cc | Water | See below. |
| 17.5 grams | Yeast | |
| 2.0 grams | Yeast food | |
| | Milk solids | 21.0 grams. |
| | Salt | 11.0 grams. |
| | Sugar | 35.0 grams. |
| | Lard | 21.0 grams. |

In both doughs, the calcium peroxide composition is added, in an amount equal to 0.375% of the total flour weight, in the dough mixing stage. Such addition provides, in both cases, an amount of calcium peroxide (computed as 100% calcium peroxide) equal to about 0.003% of the total flour weight. To make a dough of the proper consistency, control dough 1 required the addition of 165 cc. of water in the dough mixing stage. On the other hand, to make a dough of the proper consistency, test dough 2 required the addition of 172 cc. of water in the dough mixing stage. Thus, the novel coated calcium peroxide composition of the present invention yielded an increased water absorption of approximately 1% or half again as much water absorption increase as is normally obtained by the use of conventional, uncoated calcium peroxide. Even though test dough 2 accepted an additional 1% of water, the two doughs were of equal dryness and had equal machining qualities.

Bread was baked from the two doughs in conventional fashion and the baked loaves compared. It was found that the loaves prepared from test dough 2 showed increased softness, slightly improved volume, and better grain and texture than the loaves from control dough 1. Further, because of the additional water absorbed by test dough 2, it is obvious that a greater yield of bread is obtained from that dough than from the control dough.

In general, baking tests with other bread improver compounds protected with an edible coating material in accordance with the present invention will show an improvement, as compared to the conventional use of the same compound in unprotected form.

*Example 3*

A multiple component bread improver composition is prepared by blending, in any suitable mixing device, the monoglyceride-coated calcium peroxide of Example 1, full fat enzymatically active soy flour and partially dextrinized corn flour, in accordance with the following formulation:

| Ingredient | Percent by Weight |
|---|---|
| Monoglyceride-coated calcium peroxide | 1.20 |
| Enzymatically active full fat soy flour | 40.00 |
| Partially dextrinized corn flour | 58.80 |

Comparative storage tests for this composition and for a conventionally prepared composition of the same constituency, but employing uncoated calcium peroxide, were carried out, some samples of each composition being stored at room temperature and some at 96° F. In such tests, the enzyme activity of the soy flour constituent of the compositions employing conventional uncoated calcium peroxide frequently decreased by as much as 50% in times as short as three months, while no undue decrease in the enzyme activity of the soy flour constituent of the compositions of this invention were noted over periods as long as six months. Further, in the case of compositions employing full fat soy flour as the enzymatically active constituent, rancidity frequently was observed in the compositions employing uncoated calcium peroxide in periods as short as 60 to 90 days.

To compare the effects of the novel composition of this example with those obtained with conventional compositions employing soy flour with uncoated calcium peroxide, a test bake was carried out in the same manner detailed in Example 2. Thus, a control dough 1 was prepared, using the conventional composition in an amount equal to ⅜% of the total flour weight, and a test dough 2 was prepared, using the novel composition of this example, in a like proportion. Both bread improver compositions were added in the dough mixing stage. The procedures for both doughs were identical, except that dough 2 required 172 cc. of water in the dough mixing stage, as compared to 165 cc. for dough 1, to obtain a dough of proper consistency. Thus, the dough prepared with the novel composition of this example, using specially coated calcium peroxide, absorbed an additional 1% of water, while maintaining equal dryness and machineability. In this test, the conventional composition was one which had been stored for several months, having been obtained on the open market. In the bread obtained, a definite improvement in crumb color was noted in the loaves made from dough 2, indicating that the soy flour of the conventional composition had lost some of its lipoxidase activity and therefore had less dough bleaching ability. The loaves from dough 2 also evidenced a greater calcium peroxide effect than those from control dough 1.

Example 4

A multi-component bread improver composition is prepared, using both calcium peroxide and dicalcium phosphate coated with a monoglyceride in the manner described in Example 1, in accordance with the following formulation, designed for use at the rate of 1% of the total flour weight in the dough:

| Ingredient | Parts by Weight |
| --- | --- |
| Enzymatically active full fat soy flour | 20.0 |
| Monoglyceride-coated calcium peroxide as per Example 1 | 0.3 |
| Monoglyceride-coated dicalcium phosphate, as per Example 1 | 5.0 |
| Partially dextrinized corn flour | 74.7 |

For comparison, the composition of the same formulation is made, using unprotected calcium peroxide and unprotected dicalcium phosphate.

Test quantities of both compositions are stored in closed containers at 98° F., and tested for lipoxidase activity and observed for rancidity. The lipoxidase activity of the soy flour component of the conventionally prepared composition, wherein the calcium peroxide and dicalcium phosphate are unprotected, decreases by as much as 65–70% in as little as 55 days, such decrease being the result of enzyme deactivation by contact of the soy flour with the unprotected calcium peroxide and dicalcium phosphate. The composition of this example, however, shows no undue decrease in lipoxidase activity over storage periods of 6 months and longer. Similarly, the novel composition of this example remains free of rancidity for periods of 6 months and longer, while the conventionally prepared composition becomes rancid in periods as short as 50–60 days.

Comparative bake tests show definite improvement in the baked goods, including increased water absorption, improved yield, increased softness, and better grain and texture, resulting from presence of the protective monoglyceride on the calcium peroxide and dicalcium phosphate.

Example 5

Separate quantities of finely particulate potassium bromate and finely particulate diammonium phosphate are coated with a protective monoglyceride in the manner described in Example 1. These coated inorganic bread improver compounds are then combined to form a multi-function bread improver composition of the following formulation:

| Ingredient | Percent by Weight |
| --- | --- |
| Full fat, enzymatically active soy flour | 22.00 |
| Fungal proteinase | 00.30 |
| Particulate potassium bromate, coated as per Example 1 | 0.32 |
| Particulate diammonium phosphate, coated as per Example 1 | 3.50 |
| Partially dextrinized corn flour | 73.88 |

Because of the presence of the coating material on the inorganic compounds, the above formulation contains approximately 0.3% potassium bromate and approximately 3.0% diammonium phosphate. The proteinase is employed as the commercially available proteolytic enzyme concentrate derived from *Aspergillus oryzae*.

The proteolytic enzyme material serves the conventional function of reducing dough mixing time. The enzymatically active soy flour serves the conventional functions of providing a more pliable dough and providing a dough bleaching action. Of the two inorganic materials, potassium bromate acts as a maturing agent, while diammonium phosphate is a yeast food and stimulant. The important thing to note is that a multiple component bread improver composition of this type has not heretofore been practical because both of the enzyme materials are deactivated by contact with the two inorganic compounds. In the composition of the present example, the monoglyceride coating on the particles of the inorganic compounds serves to shield the enzyme materials against enzyme deactivation. Thus the composition can be successfully stored for periods in excess of 6 months, without undue loss in enzyme activity.

The formulation of this example is designed to allow the composition to be added to bread dough at the rate of 0.75–1.0% of the total flour weight. Test bakes with such a composition, made after the composition has been stored for periods on the order of 6 months, show the desirable bread improving effects of all of the several constituents.

In considering Examples 2–5, it will be noted that the desired bread improving action is always observable in the finished baked goods. This is taken as proof that the protective coating of monoglyceride is successfully removed by the aqueous phase of the dough during dough mixing operation. Of course, had such removal not occurred, the bread improving action would not be apparent. In this regard, it should be noted that other materials which might be considered as protective coatings are not actually operable for this purpose. In particular, materials like lard and the hydrogenated vegetable oil shortenings have proved, in actual tests, to provide coatings which are not successfully removed during the dough mixing stage. In other words, calcium peroxide carrying a substantial coating of lard or hydrogenated cotton seed oil, when incorporated in the dough, is totally without effect, indicating that the protective action of the coating survives substantially the entire dough mixing operation, so that the calcium peroxide is precluded from serving any function at all.

In considering bread improver compositions of the invention which include an enzymatically active material, such as those disclosed in Examples 3–5, it is important to note that, if such novel compositions are compared with conventional bread improver compositions containing enzyme materials and purchased on the open market, the compositions of this invention will, in most cases, exhibit improved results not attributable to the action of the inorganic bread improver compound. The reason for this is that, when one purchases an enzyme-containing bread improver which has been stored for some time and assuming that that bread improving composition also contains an inorganic component such as calcium peroxide or dicalcium phosphate, the enzyme constituent will have been partially deactivated during the storage time prior to purchase and use. Accordingly, when making such comparisons, the compositions of this invention will show improvements in crumb color and dough mobility simply because these compositions, even though stored for long periods, have suffered no undue enzyme deactivation.

While Example 1 illustrates the use of a particular monoglyceride, it will be understood that the same general results can be obtained with any of the protective agents hereinbefore defined. Thus, the monoglyceride in Example 1 can be replaced by an equal amount of lecithin or by an equal amount of the diacetyl tartaric acid ester of glyceryl monostearate, for example. Excellent results are also obtainable with various mixtures. For example, the monoglyceride of Example 1 can be replaced by an equal amount of a mixture of 25 parts by weight lecithin and 75 parts by weight of a glyceryl monostearate prepared by distillation from triple pressed stearic acid. Such a glyceryl monostearate product is supplied under the trademark Myverol type 18–05, by Distillation Products Industries, Rochester, N.Y., and has a monoester content of at least 90%, an iodine value of 3, a congealing point of 66° C. and a clear point of 73° C.

I claim:

1. A method for preparing bread comprising combining flour, water, other dough-forming ingredients, and a small but effective proportion of a bread improver composition comprising finely particulate calcium peroxide and an edible, normally solid, water-emulsifiable protective covering material the predominant constituent of which is at least one member of the group consisting of lecithin, monoglycerides having an iodine value not exceeding 50, mixed mono- and diglycerides having an iodine value not exceeding 50, and the tartaric acid esters of mono- and diglycerides having an iodine value not exceeding 50, the total weight of said protective covering material being equal to from a few percent of the weight of said calcium peroxide to twice the weight thereof, said protective material covering and adhering to at least a portion of the surfaces of at least a majority of the particles of said calcium peroxide, and thereby forming an initial dough mix in which at least a major proportion of the surface area of said calcium peroxide is physically separated from the water content of the mix by said protective covering material, mixing said initial dough mix to develop a completed dough and, by said mixing step, causing said protective material to be removed from the calcium peroxide by the aqueous phase of the dough and the calcium peroxide thus to be brought into contact with the aqueous phase of the dough, and baking the dough to provide a finished bread the quality of which is superior to that obtained by employing the same amount of calcium peroxide without said protective covering material.

2. The method of claim 1 wherein substantially all of the particles of calcium peroxide are completely covered by said protective material.

3. The method of claim 2 wherein said particles are individually enveloped in a continuous film of said protective material and the total weight of said protective covering material is equal to a few percent of the weight of said calcium peroxide.

References Cited in the file of this patent

UNITED STATES PATENTS

| | | |
|---|---|---|
| 2,067,912 | Frey et al. | Jan. 19, 1937 |
| 2,132,436 | Reynolds et al. | Oct. 11, 1938 |
| 2,185,368 | Bowen | Jan. 2, 1940 |
| 2,288,410 | Lippman | June 30, 1942 |
| 2,321,673 | Hall | June 15, 1943 |
| 2,736,654 | Selman et al. | Feb. 28, 1956 |

OTHER REFERENCES

"Chemicals by Glyco," 1944, Glyco Products Co., Inc. (Brooklyn, N.Y.), page 33 (Modified Polyhydric Alcohol Esters-Glyceryl Monostearate S).

"Chemicals by Glyco," 1944, Glyco Products Co., Inc. (Brooklyn, N.Y.), page 35.